United States Patent [19]

Muramatsu

[11] Patent Number: 5,592,256
[45] Date of Patent: Jan. 7, 1997

[54] PHOTOMETRY DEVICE FOR A CAMERA

[75] Inventor: Masaru Muramatsu, Kawasaki, Japan

[73] Assignee: Nikon Corporation, Tokyo, Japan

[21] Appl. No.: 654,998

[22] Filed: May 29, 1996

Related U.S. Application Data

[63] Continuation of Ser. No. 246,424, May 20, 1994, abandoned.

[30] Foreign Application Priority Data

Jun. 8, 1993 [JP] Japan ..................... 5-163919

[51] Int. Cl.⁶ ..................................... G03B 7/08
[52] U.S. Cl. .................. 396/225; 348/362; 348/366; 396/234
[58] Field of Search .................. 354/430, 432; 348/362, 366

[56] References Cited

U.S. PATENT DOCUMENTS

| | | |
|---|---|---|
| 4,395,099 | 7/1983 | Terasita . |
| 4,476,383 | 10/1984 | Fukuhara et al. . |
| 4,797,942 | 1/1989 | Burt .......................... 382/41 |
| 5,187,754 | 2/1993 | Currin et al. .............. 382/54 |
| 5,233,517 | 8/1993 | Jindra ..................... 364/413.13 |
| 5,249,015 | 9/1993 | Takagi et al. . |
| 5,266,984 | 11/1993 | Muramatsu et al. . |
| 5,270,767 | 12/1993 | Hamada et al. ........... 354/430 |
| 5,319,416 | 6/1994 | Takagi ..................... 354/432 |

Primary Examiner—Safet Metjahic
Assistant Examiner—D. P. Malloy

[57] ABSTRACT

A photometric device for use in a camera includes, but is not limited to, a segmented brightness measuring unit which segments a photographic scene of a camera into multiple areas and which outputs corresponding multiple photometric values. A spectral analysis unit performs spectral analysis of the spatial frequency of a photographic subject using the corresponding multiple photometric values output by the segmented brightness measuring unit. Also, a photometric computation unit computes photometric values based on the spectral pattern of the photographic subject output by the spectral analysis unit. The spectral analysis unit may be disposed within the photometric device, or may be located elsewhere in a camera's body.

20 Claims, 4 Drawing Sheets

PHOTOMETRY DEVICE FOR A CAMERA

This application is a continuation of application Ser. No. 08/246,424, filed May 20, 1994, now abandoned.

BACKGROUND OF THE INVENTION

1. Field of the Invention

The present invention relates to a camera photometric device and, more particularly, to a camera photometric device which segments a photographic scene into multiple areas in which to perform photometry.

2. Description of the Related Art

In the past, camera photometric devices included multi-pattern photometric units which divided or segmented a photographic scene into multiple areas in which to perform classification of a photographic subject. The multiple areas were derived by examining the maximum brightness levels and the brightness differences among sections of a photographic subject. The multiple areas were produced as a result of analysis of respective photometric outputs based on the aforementioned brightness levels which were selected from among several well-known methods, including an exposure value computation method which was appropriate for each pattern with respect to a photographic scene which corresponds to a respective pattern. The aforementioned outputs were then used to instruct camera circuitry to perform proper exposure control. For a discussion of exemplary brightness detecting photometric systems, refer to U.S. Pat. No. 4,395,099 to Terasita and U.S. Pat. No. 4,476,383 to Fukuhara et al.

It is important to note that prior photometric systems were designed so that in cases in which the maximum brightness of the photometric output was high and the differences in brightness levels were large, such photometric systems performed exposure control with an emphasis on low brightness conditions as if a photographic scene included the sun or sun light.

In terms of the problems associated with conventional photometric devices of the type described above, there are cases in which different exposures are required even in photographic scenes classified as the same pattern. For example, conventional photometric devices were often designed to recognize and detect a scene with a high maximum brightness and large differences in brightness levels (e.g., a case such as that of a person being rear-lit by the sun). In such situations, an exposure which emphasized low-brightness levels of a photographic subject was set, which resulted in a problem in that the portions on which the sun was shining were overexposed. Accordingly, the conventional classification methods described above resulted in scenes which could not be sufficiently classified and which ultimately resulted in poor picture quality.

SUMMARY OF THE INVENTION

Accordingly, it is an object of the present invention to solve the above-mentioned problems associated with existing photometric devices.

It is another object of the present invention to provide a photometric device for a camera which can perform a classification of a photographic scene having complex patterns and brightness variances with high accuracy and which makes possible the selection of a photometric computation method that accurately conforms to a photographic subject.

It is still a further object of the present invention to provide a photometric device for a camera which utilizes a spatial frequency value transformation operation to prepare exposure control commands.

It is still another object of the present invention to provide a photometric device for a camera which utilizes a Fourier transformation operation to prepare exposure control commands.

It is yet another object of the present invention to provide a photometric device which can be cost-effectively implemented in a camera device.

These and other objects of the present invention are achieved by providing a photometric device for use in a camera which includes, but is not limited to, a segmented brightness measuring unit which segments a photographic scene to be captured by the camera into multiple areas and which outputs corresponding multiple photometric values. Moreover, the photometric device includes a spectral analysis unit which performs spectral analysis of the spatial frequency of a photographic subject using the corresponding multiple photometric values output by the segmented brightness measuring unit. Also, the photometric device includes a photometric computation unit which computes photometric values based on the spectral pattern of the photographic subject output by the spectral analysis unit.

BRIEF DESCRIPTION OF THE DRAWINGS

The above-mentioned and other objects and advantages of the present invention will become apparent and more readily appreciated from the following description of the preferred embodiment, taken in conjunction with the accompanying drawings, of which.

DETAILED DESCRIPTION OF A PREFERRED EMBODIMENT

Figure 1:
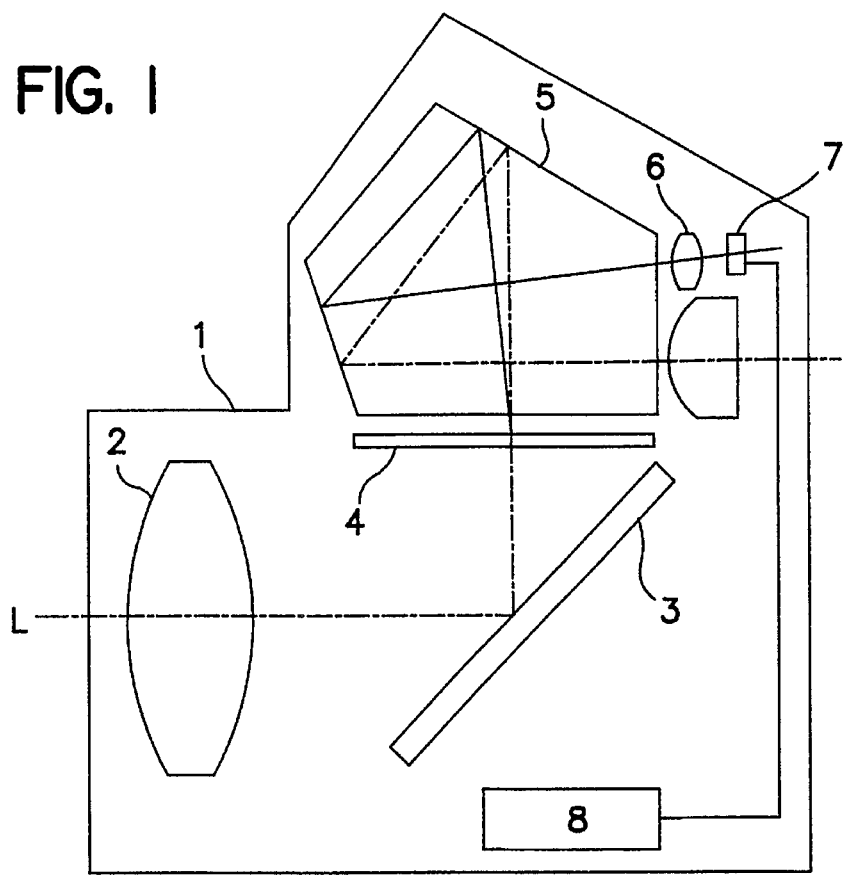
FIG. 1 is a block diagram which depicts an embodiment of a photometric device according to the present invention.

Reference will now be made to a detailed description of a preferred embodiment of the present invention with reference to the drawing figures which were briefly described above. Like parts are referred to with like reference numerals.

Referring now to FIG. 1, therein depicted is a block diagram of a single-lens reflex ("SLR") camera built into which is a preferred embodiment of a photometric device according to the present invention.

Light L reflected from a photographic subject which is to be photographed is directed to a focusing screen 4 after it passes through a picture-taking or objective lens 2. Thereafter, light L is reflected by a quick return mirror 3 to be observed as a scene by a photographer via a pentagonal prism 5 and conventional eyepiece optical system.

Figure 2:
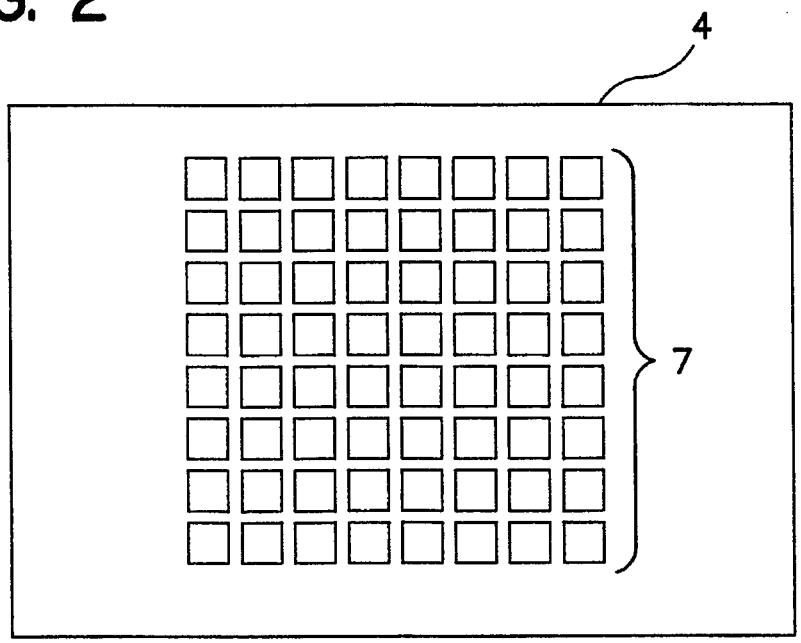
FIG. 2 is a diagram which depicts a divisional configuration of the photometric device depicted in FIG. 1.

Additionally, the image of the photographic subject which is produced by light L and which is formed on focusing screen 4 is directed to a photometric sensor 7 by a photometric image reforming lens 6. Photometric sensor 7 is a sensor with multiple segments and is shown in FIG. 2. Photometric sensor 7 produces photometric output signals which describe or otherwise model the brightness distribution of the image of the photographic subject. The signals produced by photometric sensor 7 are sent to a photometric computation unit 8.

Photometric computation unit 8 is configured to include, but should not be limited to, a microcomputer or a microprocessor. Photometric computation unit 8 computes exposure control values based on the photometric output signals produced by photometric sensor 7.

Referring now to FIG. 2, therein depicted is a diagram which illustrates a photographic scene of a segmented photometric device according to the principles of the present invention. As shown in FIG. 2, segmented photometric sensor 7, in effect, segments the photographic scene into eight sections in both the horizontal and vertical directions and outputs a total of sixty-four individual signals indicative of scene brightness data. That is, the segments forming photometric sensor 7 are arranged rectangularly (e.g., a square), but the invention should not be so limited. In fact, other arrangements and quantities of segments may be possible. For purposes of explanation, the respective photometric outputs are individually considered as the value B[x, y] where B represents BRIGHTNESS and the coordinate pair [x,y] indicates a particular segment of the photometric sensor 7.

Segmented photometric device 7 is arranged so that a sample is 8 points (e.g., segments)×8 points (e.g., segments). Thus, a high-frequency component in which the spatial frequency is 4 or more cycles per 8 points, shades image reforming lens 6 and performs division using an optical low-pass filter in order to accurately detect low-frequency components.

Figure 3:
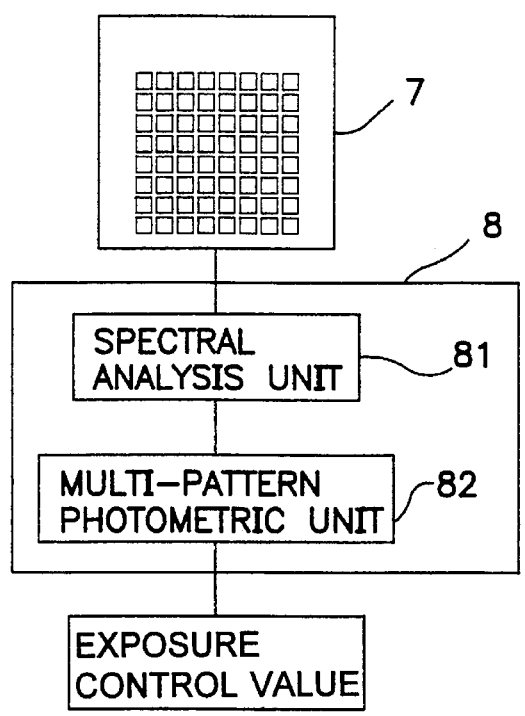
FIG. 3 is a block diagram which depicts a configuration of a photometric computation device part of the embodiment depicted in FIG. 1.

Referring now to FIG. 3, therein depicted is a block diagram which illustrates the configuration of photometric computation unit 8 for the preferred embodiment according to the present invention.

The photometric computation device 8 is configured to include a spectral analysis unit 81 which implements a discrete two-dimensional Fourier transform operation. The discrete two-dimensional Fourier transform operation is a common and well-known technique which by way of the present invention can now be applied to determining brightness distribution of a photographic subject from a photometric sensor. In the context of the present invention, however, the two-dimensional Fourier transform is used to obtain a power spectrum of the spatial frequencies of a photographic subject. A multi-pattern photometric unit 82 performs multi-pattern photometry using the power spectrum of the spatial frequency of the photographic subject and also outputs an exposure control value.

A Fourier coefficient "a" of the cos component of the two-dimensional spectrum of the photometric output B[x, y] and a Fourier coefficient "b" of the sin component are described as follows:

$$a[n, m] = 1/64 \cdot \Sigma_1 \Sigma_2 (B[x, y] \cdot \cos(2\pi nx/8) \cdot \cos(2\pi my/8)) \quad [1]$$

Where: n and m are numbers from 0 to 4;

$\Sigma_1$ expresses a sum from x=0 to 7;

$\Sigma_2$ expresses a sum from y=0 to 7.

$$b[n, m] = 1/64 \cdot \Sigma_3 \Sigma_4 (B[x, y] \cdot \sin(2\pi nx/8) \cdot \sin(2\pi my/8)) \quad [2]$$

Where:

$\Sigma_3$ expresses a sum from x=0 to 7;

$\Sigma_4$ expresses a sum from y=0 to 7.

If the number of segments in the horizontal and vertical directions is a power of 2, the photometric sensor 7 can use a so-called fast Fourier transform (FFT) algorithm, so it can execute the computations in equations [1] and [2] at a high speed using conventional techniques.

The two-dimensional power spectrum P is as follows:

$$P[n, m] = a[n, m] \cdot a[n, m] + b[n, m] \cdot b[n, m] \quad [3]$$

Figure 4:
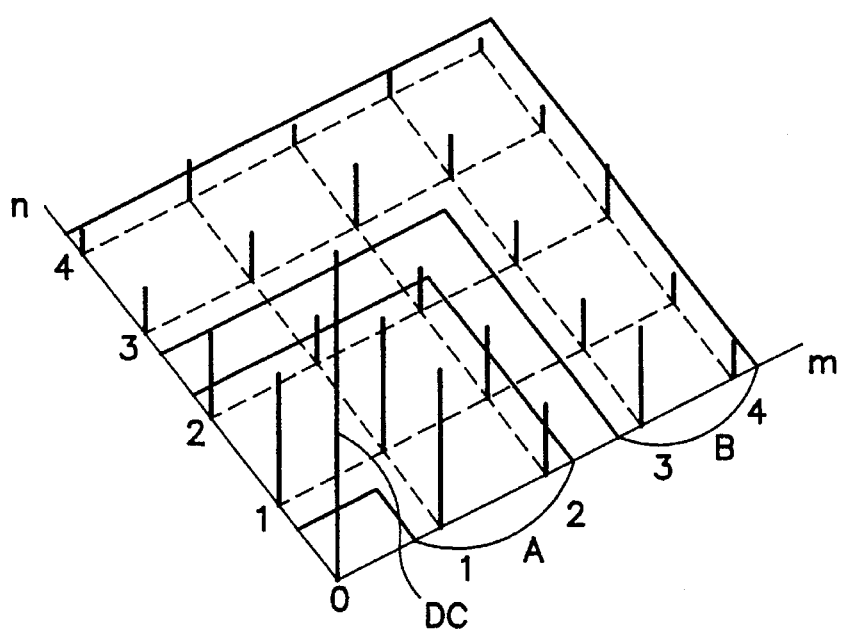
FIG. 4 is a graph which depicts an example of a two-dimensional power spectra P.

Referring now to FIG. 4, therein depicted is a graph which illustrates an example of the two-dimensional power spectra P output by spectral analysis unit 81 (FIG. 3). A total of 25 power spectra from P[0, 0] to P[4,4] are indicated.

The multi-pattern photometric unit 82 is divided into three frequency ranges: the direct current component DC of P[0, 0] in FIG. 4, 8 low-frequency ranges which are indicated by A and 16 high-frequency ranges which are indicated by B. With the three-mentioned ranges, photometric computation unit 8 computes the low-frequency component LO which is the total value of the power spectra of low-frequency range A, and the high-frequency component HI which is the total value of the high-frequency range B. Photometric computation unit 8 computes the direct current component DC, the low-frequency component LO and the high-frequency component HI according to the following equations:

$$DC = P[0, 0] \quad [4]$$

$$LO = \Sigma_5 \Sigma_6 P[n, m] - DC \quad [5]$$

$P[n, m] - DC + tm \quad [5]$

Where:

$\Sigma_5$ expresses a sum from n=0 to 2; and $\Sigma_6$ expresses a sum from m=0 to 2.

$$HI = \Sigma_7 \Sigma_8 P[n, m] - LO - DC \quad [6]$$

Where:

$\Sigma_7$ expresses a sum from n=0 to 2; and $\Sigma_8$ expresses a sum from m=0 to 2.

Figure 5:
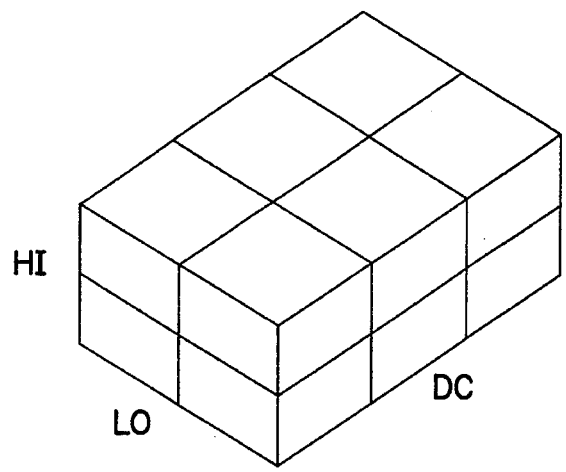
FIG. 5 is a diagram which depicts a condition in which a subject is classified by spectra.

Referring now to FIG. 5, therein depicted is a diagram which illustrates classification of a photometric subject. Classification is performed using the above-mentioned direct current component DC, low-frequency component LO and high-frequency component HI.

In FIG. 5, the photographic subject is classified into a total of twelve (12) patterns, with three (3) patterns from the size of the direct current component DC, two (2) patterns from the size of the low-frequency component LO, and two (2) patterns from the size of the high-frequency component HI.

Figure 6:
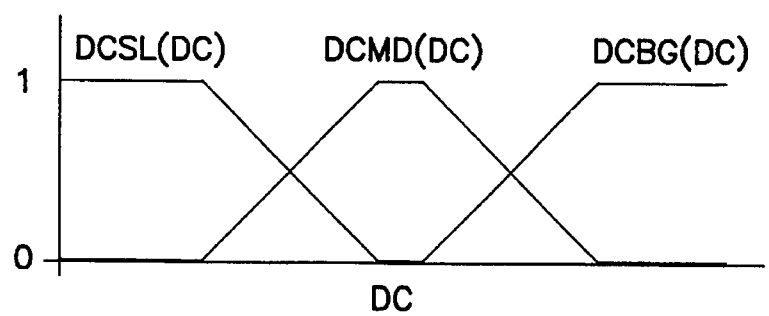
FIG. 6 is a line graph which depicts a membership function which relates to a direct current component DC.
Figure 7:
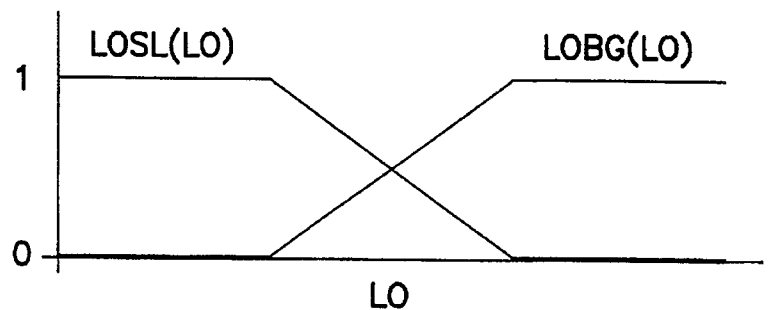
FIG. 7 is a line graph which depicts a membership function which relates to a low-frequency component LO.
Figure 8:
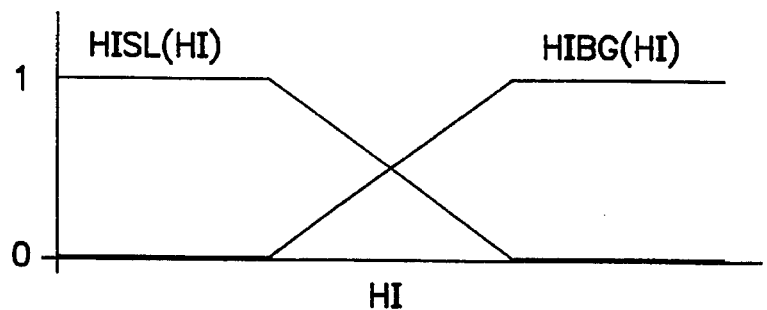
FIG. 8 is a line graph which depicts a membership function which relates to the high-frequency component HI.

Referring now to FIGS. 6–8, therein depicted are line graphs which illustrate the membership function for obtaining a degree K[n] of conformity between the photographic subject and a spectral pattern depicted in FIG. 5. The degree of conformity is determined with reference to the direct current component DC, the low-frequency component LO and the high-frequency component HI.

FIG. 6 shows membership function DCSL(DC) such that the direct current component DC of a photographic subject expresses a small degree of conformity. Membership function DCMD(DC) expresses a medium degree of conformity and membership function DCBG(DC) expresses a large degree of conformity.

FIG. 7 shows membership function LOSL(LO) such that the low-frequency component LO of the subject expresses a small degree of conformity and membership function LOBG(LO) expresses a large degree of conformity.

FIG. 8 shows membership function HISL(HI) such that the high-frequency component HI of the subject expresses a small degree of conformity and membership function HIBG(HI) expresses a large degree of conformity.

By using the membership functions discussed above, the degree K[n] to which there is conformance between the photographic subject and the twelve (12) spectral patterns in FIG. 5 is obtained as follows:

Where: Min($n_1, n_2, \ldots, n_N$) are coefficients which return the minimum value from among $n_1, n_2, \ldots, n_N$.

$$K[1]=Min(DCSL(DC), LOSL(LO), HISL(HI)) \qquad [7]$$

$$K[2]=Min(DCMD(DC), LOSL(LO), HISL(HI)) \qquad [8]$$

$$K[3]=Min(DCBG(DC), LOSL(LO), HISL(HI)) \qquad [9]$$

$$K[4]=Min(DCSL(DC), LOBG(LO), HISL(HI)) \qquad [10]$$

$$K[5]=Min(DCMD(DC), LOBG(LO), HISL(HI)) \qquad [11]$$

$$K[6]=Min(DCBG(DC), LOBG(LO), HISL(HI)) \qquad [12]$$

$$K[7]=Min(DCSL(DC), LOSL(LO), HIBG(HI)) \qquad [13]$$

$$K[8]=Min(DCMD(DC), LOSL(LO), HIBG(HI)) \qquad [14]$$

$$K[9]=Min(DCBG(DC), LOSL(LO), HIBG(HI)) \qquad [15]$$

$$K[10]=Min(DCSL(DC), LOBG(LO), HIBG(HI)) \qquad [16]$$

$$K[11]=Min(DCMD(DC), LOBG(LO), HIBG(HI)) \qquad [17]$$

$$K[12]=Min(DCBG(DC), LOBG(LO), HIBG(HI)) \qquad [18]$$

The operation expression indicated by equation [19] (listed below) is prepared for each of the twelve (12) spectral patterns shown in FIG. 5 using the direct current component DC, the low-frequency component LO and the high-frequency component HI. Moreover, BP[n] is computed as follows:

$$BP[n]=W[n, 1]\cdot DC+W[n, 2]\cdot LO+W[n, 3]\cdot HI+C[n] \qquad [19]$$

Where: n is a number from 1 to 12.

In equation [19], W and C are weighting coefficients. Preferably, weighting coefficients are chosen from those which have been studied and optimized through analysis of subject patterns extracted in advance.

An exposure control value BO is obtained based on equation [20] (listed below) by taking a weighted mean of BP[n] using the degree of conformance K[n]:

$$BO = \Sigma_8 (K[n] \cdot BP[n])/\Sigma_9 K[n] \qquad [20]$$

Where:

$\Sigma_8$ expresses a sum from n=0 to 12; and $\Sigma_9$ expresses a sum from n=0 to 12.

Figure 9:
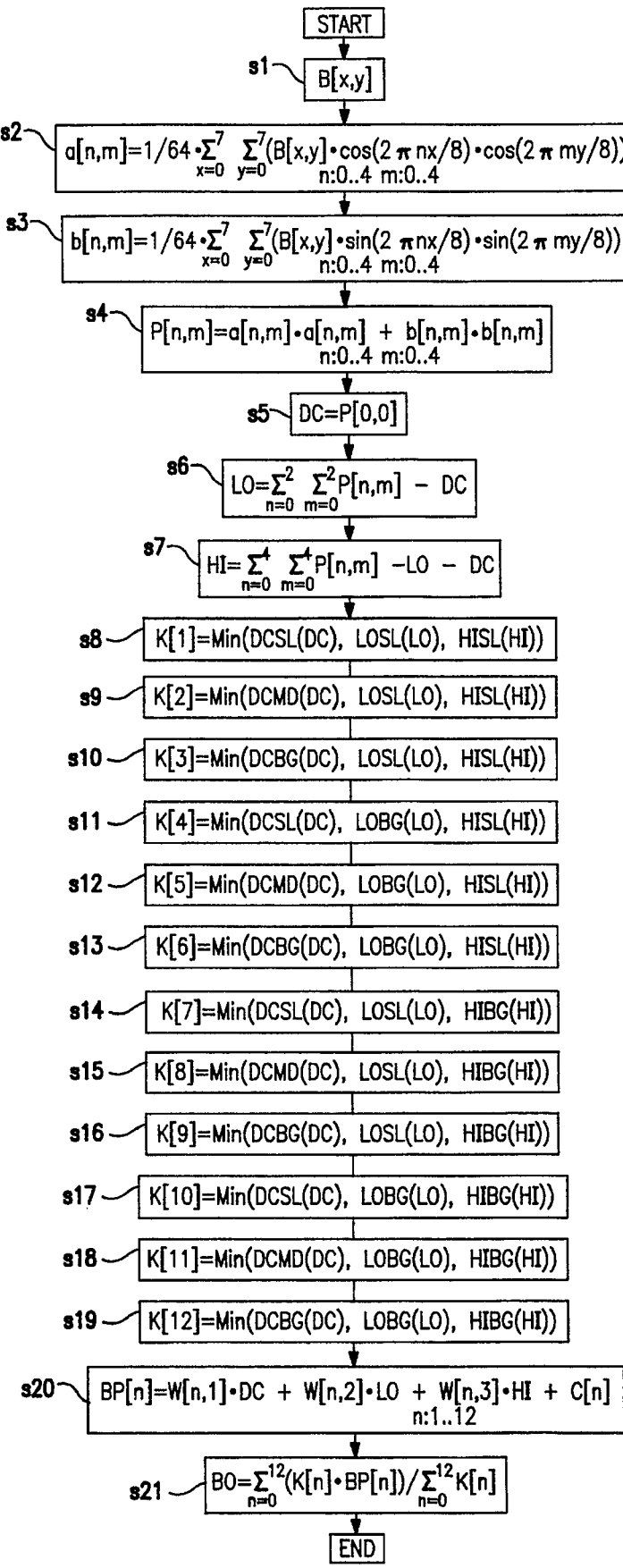
FIG. 9 is a flow chart which illustrates the operations of the photometric device depicted in FIG. 1.

Referring now to FIG. 9, therein depicted is a flow chart which outlines the operation of the photometric device of the present embodiment. Moreover, the flowchart shows the operational flow from when photometric value B is obtained to when the exposure control value BO is obtained. It is to be understood that the operational flow depicted in FIG. 9 is to be carried out by photometric computation unit 8 using well-known software and computer programming concepts and constructs.

In step s1, photometry is performed and B[x, y] is obtained.

In step s2, Fourier coefficient a of the cos component of the two-dimensional spectrum of the photometric output B[x, y] is computed, and in step s3, Fourier coefficient b of the sin component is computed.

In step s4, the power spectrum P[n, m] is computed from Fourier coefficient a and Fourier coefficient b.

In step s5, the direct current component DC is obtained from the power spectrum P[n, m]. In step s6, the low-frequency component LO is obtained.

In step s7, the high-frequency component HI is obtained.

Steps s8 through s19 obtain the degrees K[n] of conformance between a photographic image and the twelve (12) spectral patterns using the direct current component DC, the low-frequency component LO, the high-frequency component HI, and membership functions DCSU DCMD, DCBG, LOSL, LOBG, HISL and HIBG as such were described above.

In step s20, BP[n] is calculated using the direct current component DC, the low-frequency component LO, the high-frequency component HI, and coefficients W and C as such were described above.

In step s21, the weighted mean of BP[n] is taken using the degree of conformance K[n] to obtain the exposure control value BO, thereby completing the operational flow.

In the present embodiment, only the power spectra were used in the spectral pattern classification, but it is also possible to classify using the respective frequency phases. Where respective frequency phases are used, the photographic subject can be even more accurately classified.

The phases $\Theta$ at the respective frequencies are as follows:

$$\Theta[n, m]=\tan^{-1}(b[n, m]/a[n, m]) \qquad [21]$$

For example, $\Theta[1, 1]$ expresses the phase of the wave of the first cycle in the vertical and the horizontal directions, and if $\Theta[1, 1]$ is 0 degrees, it will be observed that the center section is dark and in a rear-lit condition. If $\Theta[1, 1]$ is 180 degrees, it will be observed that the center section is bright and in a front-lit condition.

The description above indicates that if classification is performed using $\Theta[1, 1]$, it is possible to classify the subject into front-lit and rear-lit conditions. In this way, spectral classification is not limited to the methods described above. To the contrary, if classification is done using the power spectrum and the phase, it is possible to determine the exposure of the subject more accurately.

Moreover, the spectral analysis device should be understood as limited to use of the Fourier transform. To the contrary, other spectral analysis methods may also be used. For example, a subject can be classified using spatial frequency operations, or even a discrete cosine transform (DCT) which only uses a cosine function. Moreover, a discrete sine transform, which only uses a sine function, or a Walsh transform, which uses a Walsh function which is a binary function of +1 and −1, may be used. In a Walsh transform, in particular, since only the two values of +1 or −1 are used, it is possible to perform spectral analysis computations at a high speed even with a small-scale device. The optimum spectral analysis unit can be operated from among the above-mentioned methods, but should not be so limited. As new and different methods are developed and miniaturized such methods may also be used. All that is necessary is that a particular method be able to provide required performance levels and be capable of implementation in a camera's photometric device.

Although a preferred embodiment of the present invention has been shown and described, it will be readily appreciated by those of ordinary skill in the art that many changes and modifications may be made to the embodiment without departing from the spirit or scope of the present invention which is defined in the appended claims and in equivalents thereof.

What is claimed is:

1. A photometric device for use in a camera, the photometric device comprising:

segmented brightness measuring means for segmenting a photographic scene of the camera into multiple areas and for outputting corresponding multiple photometric values;

spectral analysis means for performing spectral analysis of the spatial frequency of a photographic subject using the corresponding multiple photometric values output by said segmented brightness measuring means; and photometric computation means for performing photometric computations based on the spectral pattern of the photographic subject output by said spectral analysis means to produce exposure control values.

2. The photometric device according to claim 1, wherein said spectral analysis means performs spectral analysis by using a Fourier transformation operation.

3. The photometric device according to claim 1, wherein said segmented brightness measuring means includes a plurality of segments corresponding to sections of the photographic scene of the camera.

4. The photometric device according to claim 3, wherein said plurality of segments is a power of 2.

5. A photometric device for use in a camera, the photometric device comprising:

a segmented brightness measuring unit segmenting a photographic scene of the camera into multiple areas and outputting corresponding multiple photometric values;

a spectral analysis unit performing spectral analysis of the spatial frequency of a photographic subject using the corresponding multiple photometric values output by said segmented brightness measuring unit; and a photometric computation unit computing exposure control values based on the spectral pattern of the photographic subject output by said spectral analysis unit.

6. The photometric device according to claim 5, wherein said spectral analysis unit performs spectral analysis using a Fourier transformation operation.

7. The photometric device according to claim 5, wherein said segmented brightness measuring unit includes a plurality of segments corresponding to sections of the photographic scene of the camera.

8. The photometric device according to claim 7, wherein said plurality of segments is a power of 2.

9. The photometric device according to claim 8, wherein said plurality of segments comprises 64 segments arranged rectangularly.

10. A photometric device for use in a camera, the photometric device comprising:

a segmented brightness measuring unit segmenting a photographic scene of the camera into multiple areas and outputting corresponding multiple photometric values; and a photometric computation unit computing exposure control values based on a spatial frequency distribution of said corresponding multiple photometric values.

11. The photometric device according to claim 10, further comprising:

a spectral analysis unit performing spectral analysis of the spatial frequency of a photographic subject using the corresponding multiple photometric values output by said segmented brightness measuring unit to produce spectral output values, said photometric computation unit computing said exposure control values based on said spectral output values.

12. The photometric device according to claim 11, wherein said spectral analysis unit performs spectral analysis using a Fourier transformation operation.

13. The photometric device according to claim 11, wherein said spectral analysis unit performs spectral analysis using a discrete cosine transform (DCT) operation.

14. The photometric device according to claim 11, wherein said segmented brightness measuring unit includes a plurality of segments corresponding to sections of the photographic scene of the camera.

15. The photometric device according to claim 14, wherein said plurality of segments is a power of 2.

16. A photometric device for use in a camera, the photometric device comprising:

a segmented brightness measuring unit to segment a photographic scene of the camera into multiple areas, and in response, outputting corresponding multiple photometric values;

a spectral analysis unit to perform a spectral analysis of the corresponding photometric values to obtain a power spectrum of the spatial frequencies of a subject; and a multi-pattern photometric unit to determine a direct current component, a low-frequency component, and a high frequency current component of the power spectrum, to obtain degrees of conformance between the photographic scene and a plurality of spectral patterns using the direct current, low-frequency and high-frequency components and a plurality of membership functions, and to obtain an exposure control value by taking a weighted mean using the degrees of conformance.

17. The photometric device according to claim 16, wherein the spectral analysis unit performs the spectral analysis by using a Fourier transform operation.

18. The photometric device according to claim 16, wherein the spectral analysis unit performs the spectral analysis by using a discrete cosine transform operation.

19. The photometric device according to claim 16, wherein the spectral analysis unit performs the spectral analysis by using a discrete sine transform operation.

20. The photometric device according to claim 16, wherein the spectral analysis unit performs the spectral analysis by using a Walsh transform operation.

* * * * *